US012115806B2

(12) United States Patent
Rohlfing

(10) Patent No.: US 12,115,806 B2
(45) Date of Patent: Oct. 15, 2024

(54) DEVICE FOR PRODUCING AN ADHESIVE-BOUND PRINTED PRODUCT WITH A TRANSPORT SYSTEM

(71) Applicant: Müller Martini Holding AG, Hergiswil (CH)

(72) Inventor: Thomas Rohlfing, Rahden (DE)

(73) Assignee: MULLER MARTINI HOLDING AG, Hergiswil (CH)

( * ) Notice: Subject to any disclaimer, the term of this patent is extended or adjusted under 35 U.S.C. 154(b) by 0 days.

(21) Appl. No.: 18/222,762

(22) Filed: Jul. 17, 2023

(65) Prior Publication Data

US 2024/0034089 A1 Feb. 1, 2024

(30) Foreign Application Priority Data

Jul. 18, 2022 (DE) ......................... 102022117920.6

(51) Int. Cl.
*B42C 19/08* (2006.01)

(52) U.S. Cl.
CPC .................................... *B42C 19/08* (2013.01)

(58) Field of Classification Search
CPC ....................................................... B42C 19/08
USPC ........................ 412/9, 11, 13, 14, 18, 25, 33
See application file for complete search history.

(56) References Cited

U.S. PATENT DOCUMENTS 4,133,521 A * 1/1979 Muller ..................... B65H 5/30
270/52.2
4,467,912 A 8/1984 Rathert
5,921,538 A * 7/1999 Schlough .................. B42C 1/12
412/37
7,467,450 B2 12/2008 Rygol et al.
2022/0032676 A1 2/2022 Braschoss et al.

FOREIGN PATENT DOCUMENTS

DE 3107458 A1 9/1982
EP 0699611 A1 3/1996
EP 3954542 A1 2/2022

OTHER PUBLICATIONS

European Search Report in corresponding European Patent Application No. 23185191.6, mailed Nov. 6, 2023, 5 pages.

* cited by examiner

*Primary Examiner* — Justin V Lewis
(74) *Attorney, Agent, or Firm* — FisherBroyles, LLP; Robert Kinberg

(57) ABSTRACT

An apparatus for producing an adhesive-bound printed product comprises an endlessly circulating transport system where a transport clamp holds a clamped-in printed product with the aid of a first adjusting mechanism that generates a first movement component while the printed product circulates through the apparatus. To favorably influence an opening and/or closing movement depending on the printed product), the apparatus comprises a second adjusting mechanism to be selectively activated and to generate in an activated position a second movement component that acts upon a swivel arm. The second movement component is oriented counter to an upward movement of the control arm induced by the first movement component. The counter-oriented movement components are compensated via a second mechanical spring which supports the swivel arm relative to the control arm.

9 Claims, 8 Drawing Sheets

DEVICE FOR PRODUCING AN ADHESIVE-BOUND PRINTED PRODUCT WITH A TRANSPORT SYSTEM

CROSS-REFERENCE TO RELATED APPLICATIONS

This application claims priority to German application No. 102022117920.6 filed Jul. 18, 2022, the entire contents of which is incorporated herein by reference.

BACKGROUND OF THE INVENTION

The present invention relates to an apparatus for producing an adhesive-bound printed product, said apparatus having a transport system in which several transport clamps for conveying respectively clamped-in printed products which endlessly circulate along a curved track and where each transport clamp comprises a clamping element held on a swivel arm, which clamping element can be moved back and forth via the swivel arm between an open position and a clamping position, further comprising a control arm which is connected at a first end via a spring box to the swivel arm and at a second end to a first actuating mechanism, wherein the control arm transmits a first movement component generated by the actuating mechanism via the spring box to the swivel arm, wherein the first movement component points in a direction where the adjustable clamping element is swiveled from the closed position to an open position, wherein a first mechanical spring is arranged in the spring box which, in the clamping position of the clamping element, exerts a clamping force onto the clamped-in printed product via a tension rod arranged in the spring box and the swivel arm and wherein the tension rod with the aid of a coupling rod connected to the swivel arm in the clamping position of the clamping element evens out different thicknesses of the clamped-in printed product between the swivel arm and the control arm through compressing or expanding of the first mechanical spring.

A generic apparatus of this type is known from the document EP 3954542 A1, which discloses an apparatus for producing adhesive-bound printed products, in particular book blocks. The apparatus comprises a transport system with a number of transport clamps attached to a continuously circulating chain. Each transport clamp comprises a clamping jaw which forms the clamping element that moves with a swiveling movement. In the intake region where the transport clamp picks up a printed product, the clamping jaw is closed once the printed product is held in the transport clamp, so that the printed product remains clamped in. The transport system then transports the clamped-in printed product through the apparatus, wherein the printed product is processed by suitable machines along the transport path. Once the printed product has passed all processing stations of the apparatus, it can be transported out of the apparatus in a discharge zone. For this, the clamping jaw is opened so that the printed product is no longer clamped in once it is in the discharge zone.

As example for a first adjusting mechanism, the movements of the clamping jaws are controlled via a cam track on which at least one roller for each transport clamp rolls off, which roller is connected via a control arm to the clamping jaw of the respective transport clamp. Since the cam track changes its orientation and/or spatial position along the section where the printed products are transported through the apparatus, relative to the course of the transport chain or the curve track of the clamp, it generates and exerts an adjustment pulse onto the roll that is rolling off thereon and the connected control arm during the circulating movement of the transport chain at the locations where the orientation or its spatial position changes, relative to the course of the transport chain. The swiveling position of the clamping jaw changes to a desired direction specified by the control device as a result of the adjustment pulse as movement component. Not only can the opening and closing movements of the clamping jaw be controlled precisely via the orientation and spatial positioning of the cam track along its course, but the clamping jaw can also be maintained in the open and closed position. Between the intake zone and the discharge zone, the respective clamping jaw can also be maintained in the closed position via an additional locking device, installed in the respective clamping jaw, so that the printed product is kept clamped into the transport clamp along the transport path while traveling through the apparatus and, in particular, while being processed in the apparatus. During the transport, the printed product is moved along with the transport clamp while supported well on both sides.

The clamping jaw can adjust its closing position individually to the actual size of the printed product. So that the apparatus can process printed products having varied thicknesses, without having to readjust the transport clamps each time to the appropriate measure, the document EP 3954542 A1 discloses arranging a mechanical tensioning spring as length-variable connector between the control arm and the swivel arm where the clamping jaw is attached. The tensioning force of said spring is directed counter to the closing movement of the clamping jaw and generates accordingly a tensioning force for holding the printed product in the transport clamp once a printed product is clamped into the clamping jaw. The rotating positioning of the swivel arm on a rotational axis and the rotating joint between the pivoting arm and the spring box that is rigidly connected to the control arm allow turning the swivel arm, relative to the control arm, while the mechanical tensioning spring keeps the swivel arm via its tensioning force in a starting position, but also allows a compression movement when the clamping element is pressed onto a printed product. If, during a closing movement, the clamping jaw comes to rest early on a printed product to be clamped in, because said product is particularly thick, the control arm nevertheless can rotate to its maximum closing position that is predetermined by its cam track because the swivel arm with thereto attached clamping jaw no longer moves toward the printed product. The swiveling movement of the control arm is introduced into the mechanical spring, which then changes its length such that it matches the translation ratio of the movement component generated by the control arm via the lever arms for the swivel arm from the clamping element to the rotational axis of the swivel arm and the swivel arm from the rotational axis of the swivel arm to the connection with the spring box. The tensioning spring is dimensioned such that it maintains nearly the same tensioning force for block thicknesses between, for example, 1 mm and 30 mm. The tensioning spring can thus compensate for different print product thicknesses via its compression travel, wherein different configurations of the tensioning spring are possible. In this thickness range, an individual realignment of the setup is therefore not necessary. The length-variable connector exerts a clamping force onto the printed products when the clamping element is in the closed position.

Depending on the format, thickness, and paper type of the printed product, it is not totally impossible that a printed product is no longer held together sufficiently once the clamping jaw opens up and could slide uncontrolled from the transport clamp before it can be taken over, supported, and conveyed away by a secondary conveying system. This problem can occur in particular with conveying systems where the clamping jaw is moved over a longer track so that a printed product can be placed into a transport clamp or removed from it because in those systems the clamping jaw must travel over a comparably long which cannot be designed optionally since the conveying speeds of these apparatuses have a forced cam track control that is standard. Whereas the clamping jaw can still hold a thick printed product clamped in while the first adjusting mechanism is already moving the control arm to an opening position, owing to the fact that the opening movement of the control arm, relative to the swivel arm, is compensated by the mechanical spring, this same movement of the control arm moving in the direction of the opening position with a thin printed product almost immediately leads to the clamping element being lifted off the printed product, meaning the printed product is no longer clamped in during the further opening movement because the smaller thickness was not compensated by the mechanical spring. With a generic compensation method for different thicknesses of printed products by means of a mechanical spring, the movement profile preset by a positively controlled cam track thus always represents a compromise between different possible movement profiles which represent an optimum movement for respectively different formats of printed products.

SUMMARY OF THE INVENTION

It is therefore an object of the present invention to design the opening movement of the clamping element such that it can be optionally changed, so as to improve the support of a printed product in the discharge zone, even one having an unusual format size and especially relating to block thickness.

The above and other objects are solved by providing the apparatus with a second, optionally (selectively) activatable adjusting mechanism which, in an activated position, generates a second movement component that acts upon the swivel arm, wherein the second movement component is directed counter to the upward movement of the control arm induced by the first movement component, and the opposite-oriented movement components are compensated with the aid of a second mechanical spring, which supports the swivel arm relative to the control arm.

With the inventive apparatus, the control of the opening and closing movement of the control arm and the swivel arm with a clamping element connected to it via a rotating axis and a spring box takes place in the same way as known from the prior art. The swivel arm in this case can deflect in the known manner against the mechanical spring in the spring box to equalize in this way different thicknesses of the printed products clamped into the transport clamp. The second adjusting mechanism now provides the option to embody a control arm opening movement induced by the first adjusting mechanism on the actual opening of the swivel arm, and thus the effect on the clamping element so as to be variable, even if the primary opening movement by the first adjusting mechanism remains unchanged and controlled and thus not variable. The control arm therefore always moves as preset by the first adjusting mechanism and the movement of the swivel arm that is connected to the control arm depends on whether the second adjusting mechanism is activated or not and, therefore, does or does not have an effect on the second movement component.

In particular with thinner printed products or printed products with very smooth surfaces, the opening movements can be neutralized completely or at least slowed down via the second movement component, which is counter to the first movement component generated by the first adjusting mechanism, in order to shorten the time interval during which the printed product is not clamped in tightly and is supported in the transport clamp. The second movement component can also be configured such that the clamping element is no longer pressed onto the printed product but is held at a short distance thereto, so that a good support of the printed product still results before it is released to the following conveying organ. The movement component generated by the second adjusting mechanism is adjusted to a suitable value, but can also be variable during the course of a swivel arm opening movement.

Depending on the configuration, the movement components for the two adjusting mechanisms cancel each other out, at least in part and at least over a certain time period so that the clamping element either does not open at all or at least opens slower if and as long as the second adjusting mechanism introduces the second movement component it generates into the course of the movement by the swivel arm with thereto attached clamping element. The point in time at which during its circulation the transport clamp reduces the clamping force and partially opens up, is thus lifted slightly off a printed product before the printed product is taken over by a discharging organ, or when it opens up completely to a maximum width specified by the first adjusting mechanism, can be moved back by the movement component of the second adjusting mechanism or can be advantageously influenced in a different way.

Owing to the fact that the second adjusting mechanism can be selectively activated, the second movement component can then be introduced into the opening movement of the swivel arm if so desired. For example, if thin printed products are processed in the apparatus, the second movement component is needed to hold the respective printed product longer in the transport clamp before it is released to a subsequent removal organ. It is different for thick printed products where the transport clamp opens up very late, relative to the thin printed products. A further delay of the opening movement in that case does not make sense and possibly would be counter-productive for a smooth transfer of the printed product to a following removal organ. If the second adjusting device is deactivated, the control of the opening movement of the swivel arm by the first adjusting mechanism is quite sufficient. The second adjusting mechanism can be activated through operator input of a control command or the second adjusting mechanism is software-controlled and automatically activated, for example by means of a software program which decides whether the second adjusting mechanism will or will not be activated based on the block thickness of the processed printed product.

The second adjusting mechanism can be configured optionally, for example also as a sliding track that is fixedly connected to the basic machine. A support roller rolling off this track activates a lever arm that is rigidly connected to the swivel arm, and introduces a movement component into the swivel arm during a change in its swivel position. For this, the second adjusting mechanism is designed to introduce the second movement component in such a way into the opening sequence of the transport clamp as necessary to achieve an improved transfer of even thin printed products or printed products with smooth paper.

Since the first and second movement components are directed counter to each other in that the first movement component moves the control arm upward and the second movement component moves the swivel arm in the direction of the closed position, the counter-directed movements must be compensated by a movable structural element to avoid damage to the components of the transport clamp. This is made possible with a second mechanical spring which supports the swivel arm relative to the control arm. The mechanical spring represents a length-variable structural element that is suitable for compensating the counter-directed movements through a change in its length. Owing to their spring characteristics, mechanical springs can be configured precisely for the respective use. They operate nearly maintenance-free and do not need a separate drive. They are compact and can be installed easily into the respective transport clamp.

During the change in length, restoring forces build up in the mechanical spring, which can be used to return the swivel arm automatically to the starting position once the second movement component is eliminated. Depending on the arrangement, the second spring in the installed position is either compressed or elongated by the second movement component. Other length-variable elements can also be used in principle as connectors in place of a mechanical spring for realizing the present invention, for example adjustable elements that are actively force-activated for the length adjustment, for example with the aid of a strong magnets, an electric motor or a hydraulic motor, as a hose or other body made from an elastic material, an adjustable cylinder connected to a hydraulic or pneumatic bladder, or an electrically operated adjusting element. However, it can be difficult to supply the elements used in place of a spring with a drive force.

According to one embodiment of the invention, the second mechanical spring is arranged inside the spring box. In the activated position, the second adjusting mechanism is connected via the swivel arm to the first end of the second mechanical spring, and the second end of the second mechanical spring is connected to the first mechanical spring via the support plate of the tension rod. In the not activated position, the second adjusting mechanism does not generate and exert a movement component onto the swivel arm and is thus also not connected to the second mechanical spring. If the second adjusting mechanism is in the activated position, thereby introducing a movement component into the swivel movement of the swivel arm, the two mechanical springs in the spring box add up the movement components respectively generated by the first and second adjusting mechanisms. Since the two connected mechanical springs are length-variable, it is possible to generate an adjusting movement of the clamping element via the expansion or contraction of the springs in the spring box, which movement represents the sum of the movement components generated by the first and second adjusting mechanisms. With a closing and opening movement generated by the first adjusting mechanism, the mechanical springs move in the same direction via the tension rod, insofar as the swivel arm moves relative to the control arm. If the second adjusting mechanism generates a second movement component within the framework of an opening movement, then the second mechanical spring moves independent of the first mechanical spring by the degree of the effect which the second movement component has on the swivel arm, if applicable corrected by a translation ratio from the swivel arm.

According to one embodiment of the invention, the tension rod comprises a coupling rod which is fixedly connected via a rotating joint to the swivel arm at its end facing away from the support plate. The rotating joint is affixed to a joint head that is rigidly connected to the swivel arm and changes its spatial position, relative to the spring box, during relative movements between the control arm and the swivel arm. On the side facing the joint head, the first mechanical spring is held in place by a perforated disc that is fixedly connected at its outer edge to the spring box. The coupling rod is guided through the hole in the perforated disk, the second mechanical spring is supported on a sleeve, on the side facing the joint head, while sleeve extends through the hole in the perforated disc and is mounted such that it can move along the coupling rod. In the inactivated position of the second adjusting mechanism, the sleeve is held in place by the second mechanical spring on the inside edge of the perforated disk, while in the activated position of the second adjusting mechanism, it is lifted up by the joint head from the inside edge of the perforated disk and is pressed into and held in place counter to the spring force of the second mechanical spring on the inside of the spring box. With this configuration of the connection between control arm and swivel arm via the spring box, the section of the spring box that faces the swivel arm is designed such that the tension rod transmits the tensioning force of the two mechanical springs to the swivel arm if the first adjusting mechanism places the control arm together with the swivel arm and thereto attached clamping element onto a printed product. The joint head pushes the sleeve by a displacement distance corresponding to the second movement component into the spring box, so as to shorten the lever by means of which the spring box holds the swivel arm against the control arm. The shortened displacement distance functions to compensate the first movement component totally or partially, meaning with the aid of the second movement component transmitted by the joint head to the sleeve. This combined transmission via the spring box of the first movement component and, insofar as it exists, also the second movement component onto the swivel arm, results in a technically simple, cost-effective, and mechanically reliable functioning, nearly maintenance-free operation.

According to one embodiment of the invention, the mechanical springs have a differing force curve. The differing force curve prevents a mechanical spring from reacting to a movement component of an adjusting mechanism to which it is not supposed to react. Thus, it would be undesirable for the second mechanical spring to also move along and change its length in a case where the first mechanical spring only must change its position, based on a movement component generated by the first adjusting mechanism. For example, if the second mechanical spring has a spring characteristic having an activation force that is considerably smaller than the activation force for the first mechanical spring, then it is the only one changing its length if triggered by the second adjusting mechanism. The different force curves thus result in a clear movement behavior where, following a movement component, only the desired spring changes its length. In particular, it is also possible with a differing force curve to design the second mechanical spring with a lower spring force, so that the second adjusting mechanism must generate only a corresponding activation force to introduce the second movement component into the movement course of the swivel arm. The lower activation forces subject the second adjusting mechanism to less wear, so that it can be built lighter and more cost-effective and the adjusting movements are more precise because lower masses must be moved and lower forces generated.

According to a different embodiment of the invention, the second adjusting mechanism is designed as a sliding track which extends only over a partial section of the circulation movement of the transport clamps in circulating direction and which cooperates with a control roller that is rigidly connected to the swivel arm. The second adjusting mechanism, in particular, can also be arranged only in the region of the exit zone for the apparatus. The transport clamps in the remaining partial track sections can then be controlled only via the first adjustment mechanism. The control roller rolls off the sliding track only with an activated second adjusting mechanism. With the aid of a control roller that unrolls on the sliding track, a second movement component can be easily, reliably and precisely generated and transmitted to the swivel arm. Sliding tracks with control rollers are low maintenance and have a long service life.

According to one embodiment of the invention, the sliding track for the second adjusting mechanism is positioned adjustable in a holding device, wherein the control rollers that are connected to the swivel arms of the transport clamps pass the sliding track contactless, at least in one of the adjusted positions. As a result of the adjustable holding of the second adjusting mechanism, it can be moved back and forth between different positions where the second adjusting mechanism does not generate a movement component in at least one of the adjusting positions and is therefore not activated. In the not activated position, the second adjusting mechanism does not generate a second movement component. Printed products with average or above average block thicknesses, for example, can be produced with this type of configuration. If critical printed products such as those with very thin block thicknesses are processed with the apparatus, the second adjusting mechanism can be placed in a position where the displacement movement of the first length-variable connectors is at least partially compensated. The second adjusting mechanism can be adjusted in stages or continuously. By moving the second adjusting mechanism to specific adjustment positions, it is possible to influence the quantity of the movement component which the second adjusting mechanism introduces into the movement course of the clamping element. If added to the movement component generated by the first adjusting mechanism and a suitable positioning of the second adjusting mechanism, we obtain a movement profile for the clamping element which is optimally adapted to the functional requirements of the respective printed product to be processed.

According to one embodiment of the invention, the holding device is provided with a motorized drive for moving the second adjusting mechanism. The drive can be an electric spindle drive, a hydraulic piston drive or the like. The motorized drive in particular can also function as support for the second adjusting mechanism during use. With the motorized drive, the second adjusting mechanism and especially the sliding track can be moved to a position where it generates a specific movement component that creates a movement profile for the clamping element which is adapted precisely to the functional requirements of the respective printed product to be processed.

One embodiment of the invention provides that the motorized drive is connected to an electronic remote control. During the processing of a printed product, the remote control can specify a certain target value for adjusting the position of the second adjusting mechanism which is especially suitable for this printed product. The remote control can be activated through the manual input of a target value into a control electronic. However, the target value can also be detected automatically, for example through the values provided by a suitable sensor system that is connected to the remote control or the format information for the printed product, obtained through a previous processing of the printed product or obtained from a memory. With a corresponding integration of the remote control into the complete control system for the apparatus or a chain of machines where the apparatus covers a partial function for the production of a printed product, it is possible to make corresponding adjustments to the motorized drive even while the machines are operational, up to a circulation size 1, without having to interrupt the operation of the apparatus.

One embodiment of the invention provides that the running surface for the sliding track, at least in an entrance region, is composed of an impact-resistant plastic material. The impact-resistant plastic material generates lower operating noises than a metal surface. Yet, an impact-resistant plastic material is not elastic enough to allow oscillations in the surface material or the movement of the coupling rod. The impact-resistant material can be fiber-reinforced.

It is understood that each of the above-described embodiments by themselves or in any optional combination, insofar as they can technically be embodied, can be combined with the subject matter of claim 1 of the present application.

Further modifications and embodiments of the invention follow from the description, the claims and the drawings below.

BRIEF DESCRIPTION OF THE DRAWINGS

The invention will now be described further with the aid of an exemplary embodiment as shown in the following figures.

DETAILED DESCRIPTION OF THE INVENTION

Figure 1:
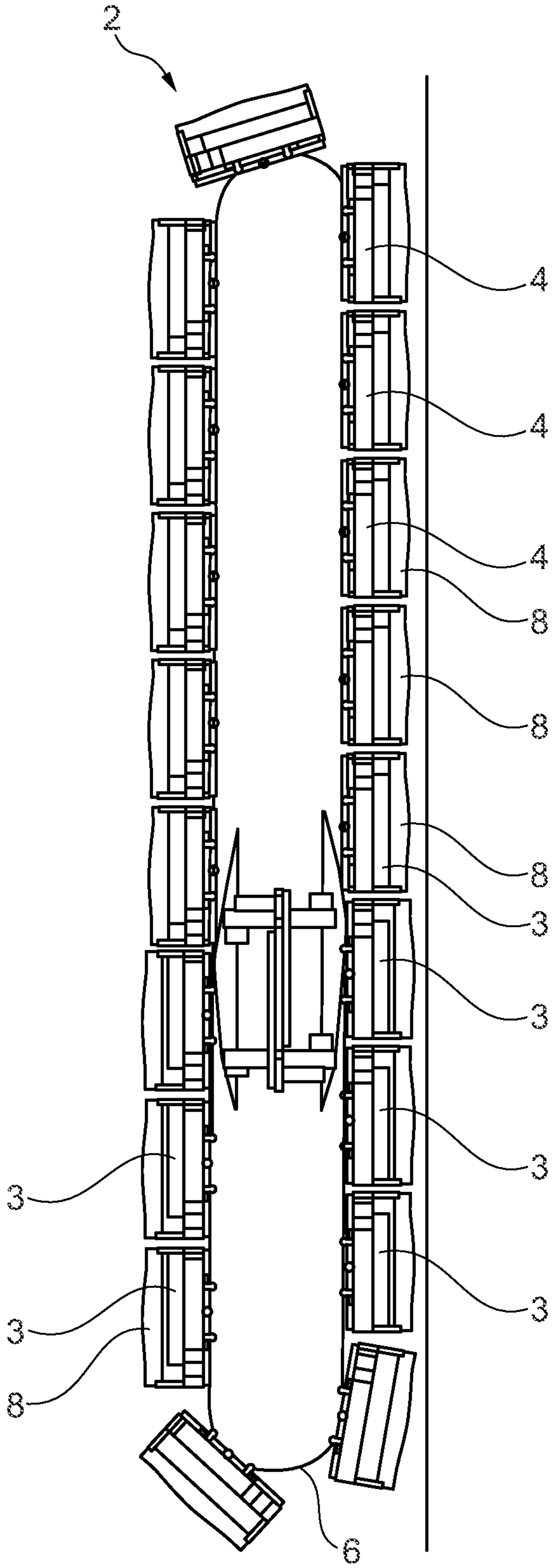
FIG. 1: A view of an apparatus as seen from above.

FIG. 1 shows an apparatus 2 for producing an adhesive-bound printed product, comprising a transport system with several transport clamps 4, designed for transporting respectively one printed product 3 clamped into a transport clamp 4, which move continuously along a cam track 6, wherein each transport clamp 4 is provided with an adjustable clamping element 8 that can be moved (swiveled) alternately between an open position and a clamping position.

Figure 2:
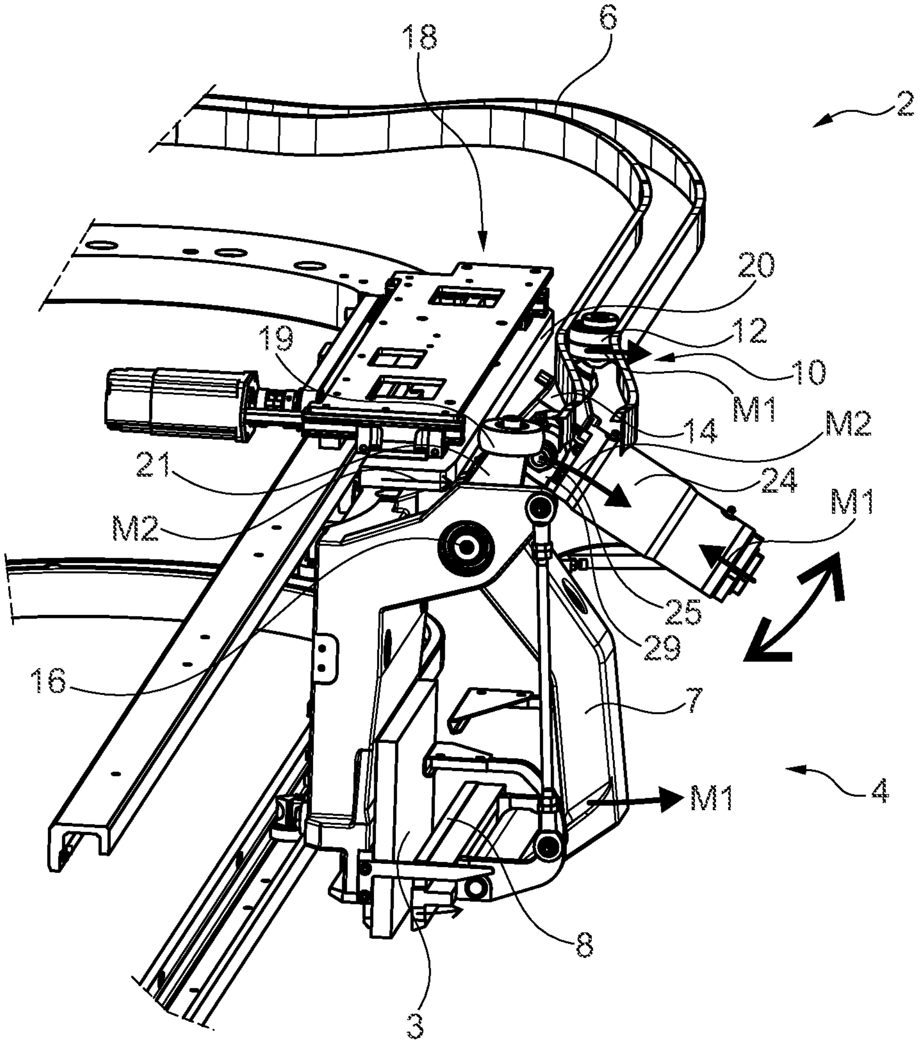
FIG. 2: A detailed view of a transport clamp in an opening zone.

The swiveling of the clamping element 8 is permanently controlled by the control arm 14, shown in FIG. 2, which is connected at its first end to the spring box 24. The swivel arm 7 is positioned on the rotating axis 16, so that it can move independent of the control arm 14. The swivel arm 7 is connected via a tab, having a joint head 29 at one end, as well as a rotating joint 25 to the spring box 24. The clamping element 8 is arranged at the lower end of the swivel arm 7. At its second end, the control arm 14 is provided with a roller 12 which circulates along the cam track 6 when the transport clamp 4 circulates along the cam track 6. The cam track 6 and the roller 12 together form a first adjusting mechanism 10 for the exemplary embodiment. A double arrow indicates the ability of the control arm 14 to swivel. During a displacement of the roller 12 in a direction which deviates from the movement track of the associated transport clamp 4, it generates a first movement component M1 which is transmitted via the control arm 14 and the spring box 24 to the swivel arm 7 and which converts the movement component M1 to a swivel movement.

In FIG. 2, the clamping element 8 is shown in a partially opened position where the clamping element 8 does not yet rest on the printed product 3 surface. During a continued opening movement, it can be swiveled from this position up further in a direction of the arrow to the right, so as to release a printed product 3 conveyed by the transport clamp 4 to a removal device that is not shown further in the drawing.

The apparatus 2 comprises a second adjusting mechanism 18 for influencing the spatial position of the clamping element 8. The second adjusting mechanism 18 generates a second movement component M2 in a direction counter to the direction of the movement component generated by the first adjusting mechanism 10. In order to generate this movement component, the second adjusting mechanism 18 comprises a sliding track 20, which is embodied to extend in conveying direction of the transport clamp 4 but only over a partial section of a circulating movement of the transport clamps 4 and thus produces a corresponding second movement component M2 only along this partial section. For this, a control roller 19 runs up onto the sliding track 20 during its approach to this track and, in the process, is pushed in a direction transverse to the conveying direction of the transport clamp 4. The control roller 19 is fixedly connected to a lever arm 21 which transmits the second movement component generated by the control roller 19 to the swivel arm 7.

Figure 3:
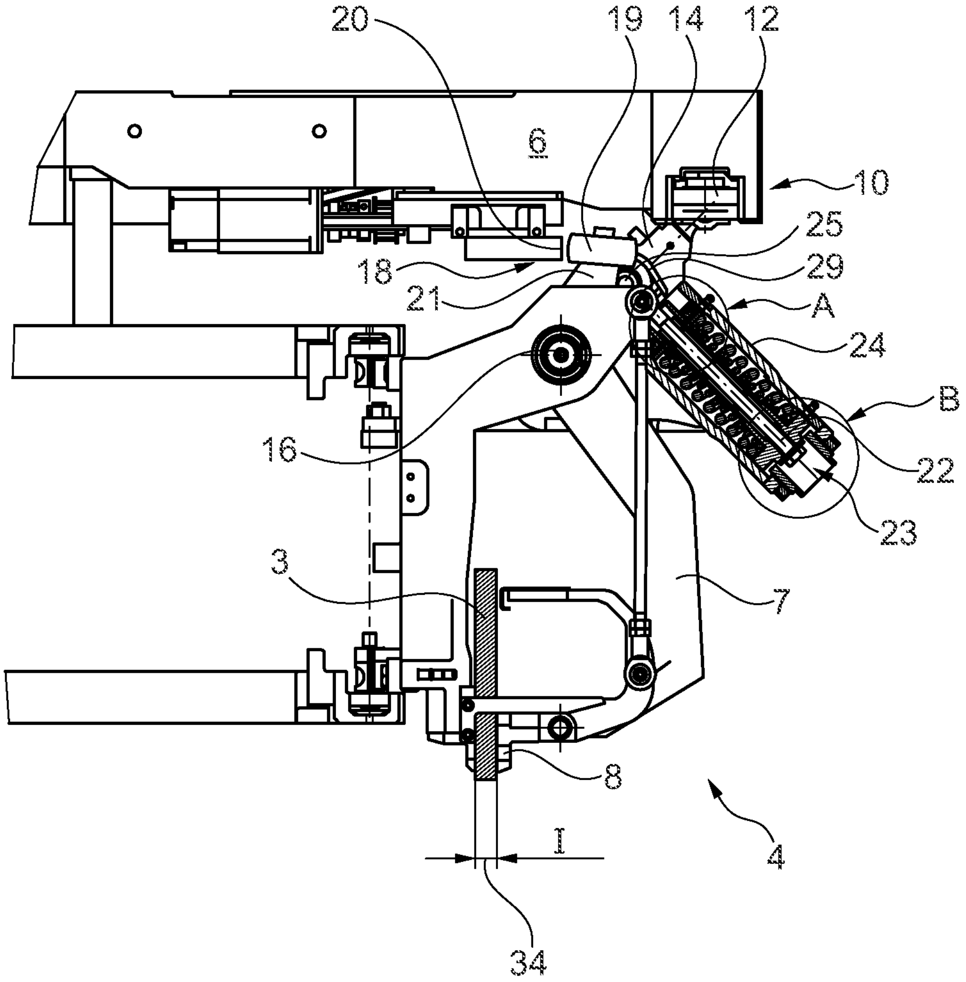
FIG. 3: A sectional view of a transport clamp with a sectional view onto the spring box.
Figure 4A:
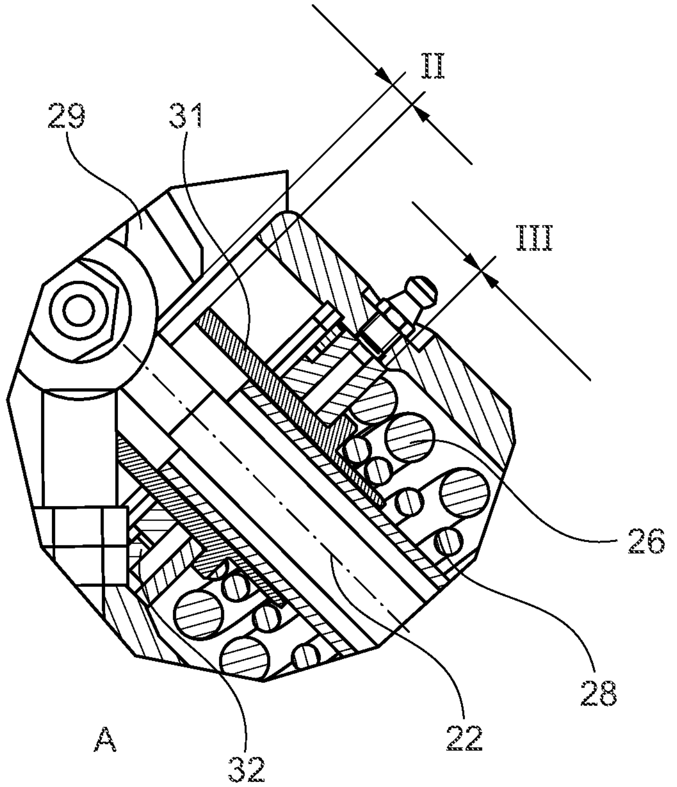
FIGS. 4A and 4B: Enlarged detailed views of the upper and lower ends, respectively, of the spring box show in FIG. 3.
Figure 4B:
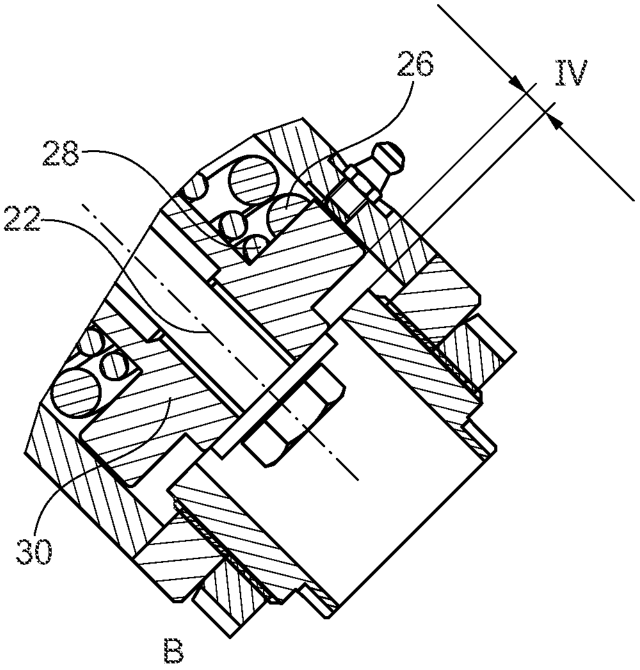

FIG. 3 shows a sectional view of a transport clamp 4 with a sectional view of the spring box 24. FIGS. 4A and 4B show enlarged details of the upper and lower ends of the spring box 24 shown in FIG. 3. In FIG. 3, the second adjusting mechanism 18 is in an inactive position, which is obvious from the clearance space between the surface of the sliding track 20 and the control roller 19. Accordingly, no second movement component M2 is introduced into the control of the swivel movement of the swivel arm 7. The swivel position shown in FIG. 3 of the swivel arm 7 is solely determined by the first movement component M1 of the first control mechanism 10.

With the swivel position of the swivel arm 7, shown in FIG. 3, the clamping element 8 is pressed against the surface of a printed product 3. At the position I, the distance between the clamping element 8 to the opposite arranged contact surface of the transport clamp 4 corresponds to the thickness measure 34 of the printed product 3. The contact pressure for holding the clamping element 8 against the printed product 3 follows from the force with which a tension rod 23 compresses the mechanical springs 26, 28. The mode of operation of the tension rod 23 can be seen easily with the aid of FIGS. 4A and 4B. The first part of a pressing movement of the control arm 14 initially only functions to place the clamping element 8 onto the surface of the printed product 3. However, if the control arm 14 continues its pressing movement during the second part, the swivel arm 7 bends relative to the control arm 14 with a rotational movement around the rotational axis 16 of the transport clamp 4. In the process, a support plate 30, the inside of which supports the ends of two mechanical springs 26, 28, is pulled from its previous position by the swivel arm 7 into the spring box 24, that is via a joint head 29, a rotating joint 25 and the coupling rod 22. The coupling rod 22 can rotate via the rotating joint 25, but is fixedly connected to the swivel arm 7 via the joint head 29. The distance between the support plate 30 in the pulled-in position from the original seat can be seen at Position IV in the enlarged view B in FIG. 4B. If a printed product 3 has a thicker measurement 34 than is shown in FIG. 3, the tension rod 23 must accommodate a longer remaining movement distance for the control arm 14 until the control arm 14 has reached its end position when the clamping element 8 is fitted onto the printed product 3, meaning the support plate 30 is consequently pulled deeper into the spring box 24. With thin printed products 3, the support plate 30 is pulled less deep or not at all into the spring box 24 once the transport clamp 4 closes.

The distance of the support plate 30 from its original seat in this case corresponds to the distance of the joint head 29 from its sleeve 31, which can be seen in Position II of FIG. 4A. The sleeve 31 is fitted onto the coupling rod 22, such that it can move in axial direction. In its position shown in FIG. 4A, the sleeve is pressed by the second mechanical spring 28 against the inside of a perforated disk 32, so that the distance between the outer seating ring of the sleeve 31 to the inside surface of the perforated disk 32 is equal to zero, as shown with Position III in FIG. 4A. Since no second movement component influences the swivel position of the swivel arm 7 shown in FIG. 3, there is no need to compensate for a shorted displacement path between the first and second movement components.

Figure 5:
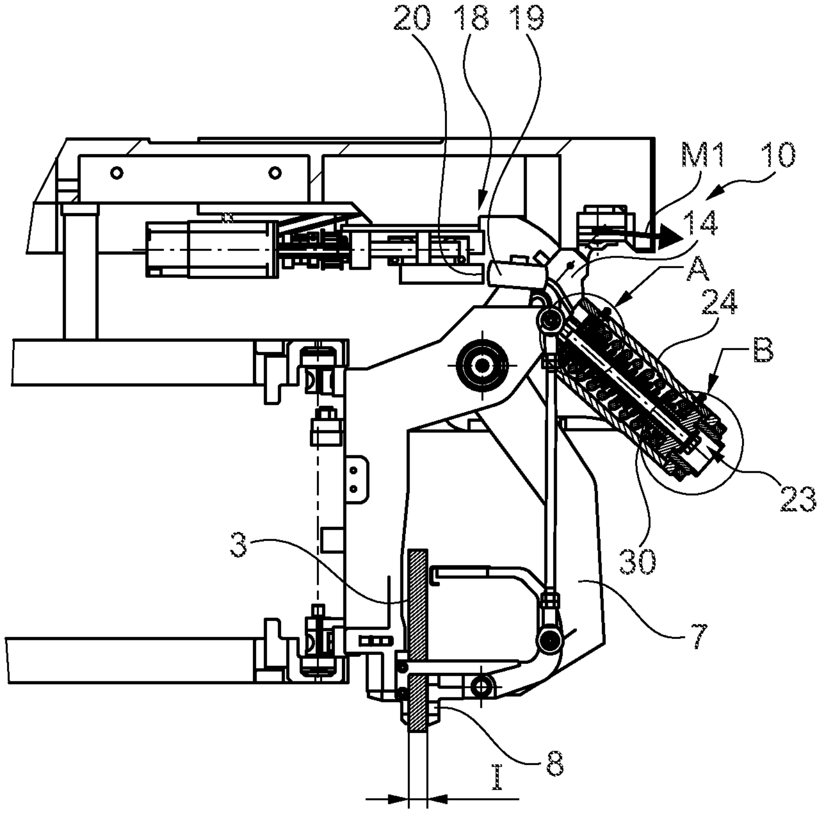
FIG. 5: The sectional view from FIG. 3, showing a different adjustment position for the first adjusting mechanism.
Figure 6A:
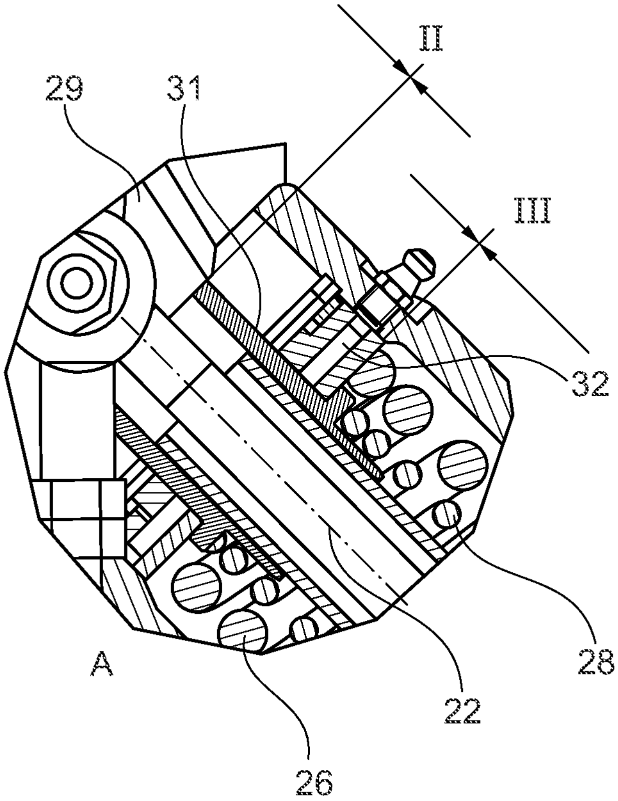
FIGS. 6A and 6B: Enlarged details of the upper and lower ends of the spring box shown in FIG. 4.
Figure 6B:
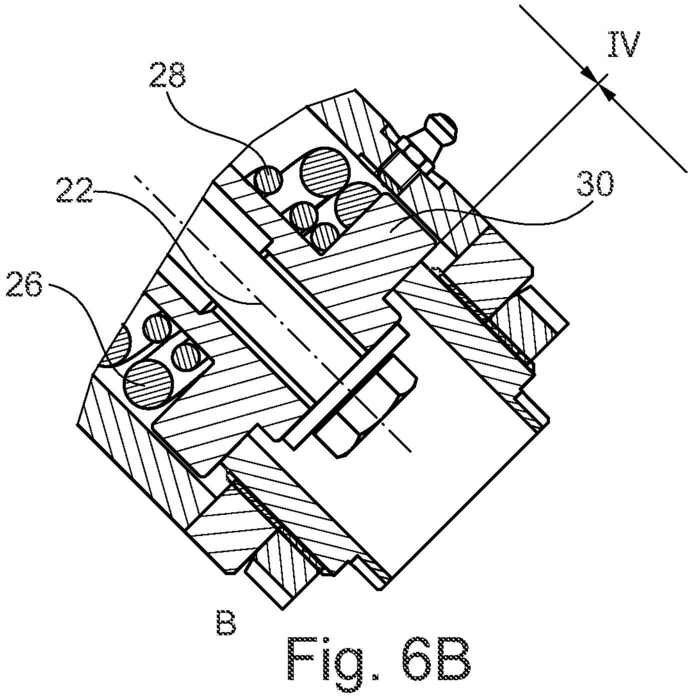

FIG. 5 shows the sectional view from FIG. 3, but with a changed position for the first adjusting mechanism 10 based on a first movement component M1 in the direction of opening a transport clamp 4. The second adjusting mechanism 18 remains inactive, as can be seen from the gap between the control roller 19 and the sliding track 20. Once the control arm 14 of the first adjusting mechanism 10 opens up as a result of the movement component M1, induced by said mechanism, the support plate 30 of the tension rod 23 initially moves back to its seat—provided it previously moved out of this seat during the closing of the transport clamp 4—before the swivel arm 7 starts its opening movement. FIG. 5 shows the position which the swivel arm 7 occupies in that case. In Position I, the clamping element 8 remains on the surface of the printed product 3, the position of the swivel arm 7 shown in FIG. 5 has not yet changed relative to the position shown in FIG. 3. As shown with the enlarged views in FIGS. 6A and 6B, however, the support plate 30 has moved back to its seat in the spring box 24, shown with Position IV in FIG. 6B, and the distance between the joint head 29 and the front surface of the sleeve 31 is zero, as shown with the Position II in FIG. 6A. The sleeve 31 has not moved and continues to be held with its seating ring at zero distance against the perforated disk 32, as shown with the drawn-in spacing in Position III of FIG. 6A.

Figure 7:
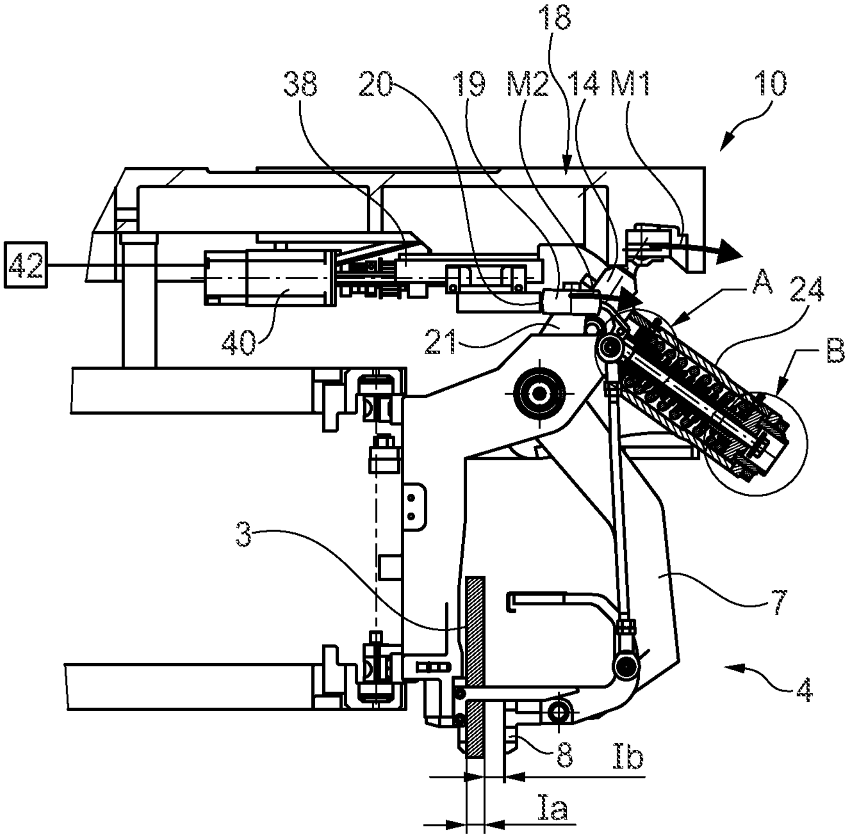
FIG. 7: The sectional view from FIG. 3 with yet another adjustment position for the first adjusting mechanism and a second movement component from the second adjusting mechanism.
Figure 8A:
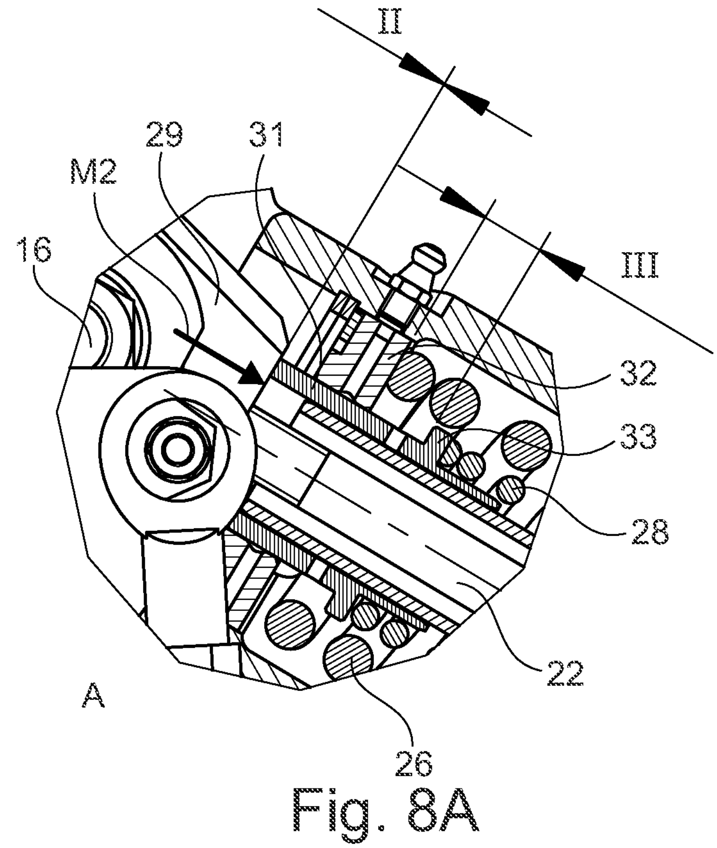
FIGS. 8A and 8B: Enlarged details of the upper and lower ends of the spring box shown in FIG. 7.
Figure 8B:
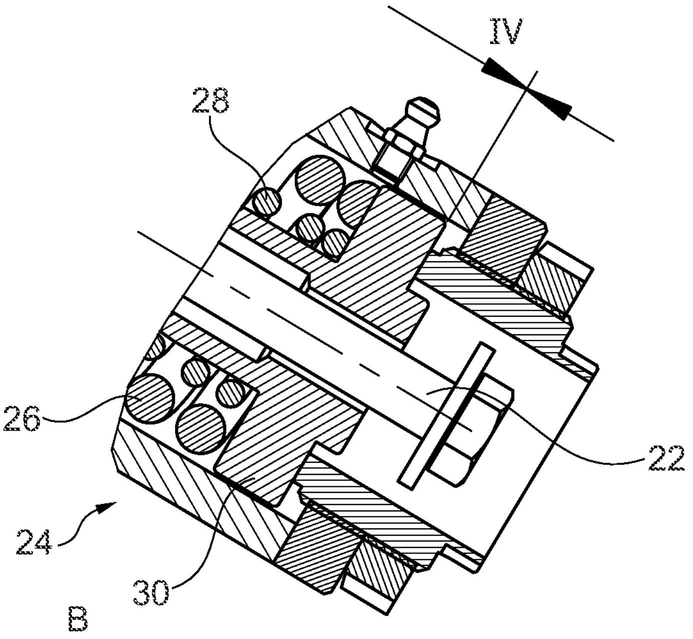

FIG. 7 shows the sectional view from FIG. 3 with a further changed position of the first adjusting mechanism 10 and a second movement component M2 from the second adjusting mechanism 18. FIG. 7 shows that the control roller 19 is now fitted onto the sliding track 20, so that the second adjusting mechanism 18 introduces a second movement component M2 into the movement of the swivel arm 7. As compared to the position in FIG. 5, the first adjusting mechanism 10 also has moved further in the direction of the transport clamp 4 opening. Since the support plate 30 in FIG. 5 has already reached its seat in the spring box 24 and maintains this seat even in the swivel position shown in FIG. 7, the swivel arm 7 is partially opened again as a result of the further advanced opening movement of the swivel arm 7, as shown with the Position IV in FIG. 8B, wherein this is also obvious from the meanwhile reached spacing between the clamping element 8 and the surface of the printed product 3, drawn in with position Ib in FIG. 7. However, as shown in FIG. 8A, the joint head 29 has pushed the sleeve 31 with its front into the spring box 24 during the further upward movement of the swivel arm 7, owing to the second movement component M2, so that the seating ring of the sleeve 31 is lifted off the perforated disk 32 toward the inside of the spring box 24, as shown with the distance measure at Position III in FIG. 8A. The opening movement of the swivel arm 7 is reduced by the same measure as the sleeve 31 is pushed into the spring box 24, wherein differences can also result from differently long lever arms in the swivel arm 7. The second adjusting mechanism 18, insofar as it is activated, has generated a second movement component M2 that acts upon the swivel arm 7, wherein the second movement component M2 is oriented counter to the upward movement of the control arm 14 which is induced by the first movement component M1. The counter-oriented movement components M1, M2 are compensated by the second mechanical spring 28 which supports the swivel arm 7 against the control arm 14.

FIG. 7 shows the second adjusting mechanism 18 inside a holding device 38, so as to be adjustable. Once the second adjusting mechanism 18 has been pulled back far enough so that the sliding track 20 is no longer in contact with the control roller 19, the mechanism is in a position where the second adjusting mechanism 18 no longer generates a movement component when the transport clamp 4 passes by. The apparatus 2 in that case can be operated solely with the movement component from the first adjusting mechanism 10. The holding device 38 is provided with a motorized drive 40, used to move the second adjusting mechanism 18. The motorized drive 40 is connected to an electronic remote control 42.

The invention is not restricted to the above-described exemplary embodiment. One skilled in the art can modify the described exemplary embodiment using available expert knowledge in a manner that makes sense, so as to adapt it to a concrete use.

REFERENCE LIST

2 apparatus
3 printed product
4 transport clamp
6 cam track
7 swivel arm
8 clamping element
10 first adjusting mechanism
12 roller
14 control arm
16 rotational axis
18 second adjusting mechanism
19 control roller
20 sliding track
21 lever arm
22 coupling rod
23 tension rod
24 spring box
25 rotating joint
26 first mechanical spring
28 second mechanical spring
29 joint head
30 support plate
31 sleeve
32 perforated disk
33 seating ring
34 thickness measure
38 holding device
40 motorized drive
42 electronic remote control
M1 first movement component
M2 second movement component

What is claimed is:

1. An apparatus for producing an adhesive-bound printed product, comprising:

a transport system including a plurality of transport clamps each for clamping therein and conveying a printed product, wherein the transport clamps are arranged to have a circulating movement endlessly along a cam track, wherein each transport clamp comprises:

a swivel arm and an adjustable clamping element attached to the swivel arm that can be movable via the swivel arm back and forth to place the adjustable clamping element in an open position and a closed position for clamping the printed product;

a spring box, a first mechanical spring arranged in the spring box, and a tension rod arranged in the spring box;

a first adjusting mechanism to generate a first movement component;

a control arm having a first end connected via the spring box to the swivel arm and a second end connected to the first adjusting mechanism to transmit the first movement component generated by the first adjusting mechanism via the spring box to the swivel arm, wherein the first movement component is oriented in an upward direction so that the adjustable clamping element is swiveled from the closed position to the open position, wherein the first mechanical spring exerts in the closed position of the clamping element a clamping force onto the clamped in printed product via the tension rod and the swivel arm, and wherein the tension rod in the closed position of the clamping element compensates for different thicknesses of the clamped-in printed product via a compression or extension of the first mechanical spring;

a second adjusting mechanism which is selectively activatable and which, in an activated position, generates a second movement component directed to the swivel arm in a direction counter to an upwardly directed movement of the control arm induced by the first movement component; and a second mechanical spring arranged to support the swivel arm against the control arm to compensate the counter directed first and second movement components.

2. The apparatus according to claim 1, wherein the second mechanical spring is arranged in the spring box, and the second adjusting mechanism when activated is connected via the swivel arm to a first end of the second mechanical spring and that the second mechanical spring is connected at a second end via a support plate of the tension rod to the first mechanical spring.

3. The apparatus according to claim 2, wherein the tension rod, at an end facing away from the support plate is fixedly connected via a rotating joint to the swivel arm, the rotating joint is installed on a joint head which is rigidly connected to the swivel arm a position of which changes relative to the spring box during relative movements between the control arm and the swivel arm, the first mechanical spring when installed is kept in place by a perforated disk that is secured with its outer edge to a wall of the spring box, on a side facing the joint head, the tension rod furthermore is inserted through a hole in the perforated disk, the second mechanical spring on a side facing the joint head is supported on a sleeve which extends through the hole of the perforated disk and is installed movable along the tension rod, the sleeve in an inactivated position of the second adjusting mechanism is held by the second mechanical spring so as to be supported on an inside edge of the perforated disk and in the activated position of the second adjusting mechanism is lifted by the joint head from the inside edge of the perforated disk and is pressed counter to the spring force of the second mechanical spring into the inside space of the spring box.

4. The apparatus according to claim 1, wherein the mechanical springs travel along differing force paths.

5. The apparatus according to claim 1, wherein the second adjusting mechanism comprises a sliding track which extends only over a partial section of the circulating movement of the transport clamps and cooperates with a control roller which is rigidly connected to the swivel arm.

6. The apparatus according to claim 5, wherein the sliding track of the second adjusting mechanism is mounted in a holding device so as to be adjustable, the control roller connected to the swivel arms of the transport clamps passes the sliding track without making contact in at least one of the adjusted positions.

7. The apparatus according to claim 6, wherein the holding device) is provided with a motorized drive which can move the second adjusting mechanism.

8. The apparatus according to claim 7, wherein the motorized drive is connected to an electronic remote control.

9. The apparatus according to claim 8, characterized in that wherein the sliding track includes a running surface comprised of a shock-resistant plastic material.

* * * * *